United States Patent
Igarashi et al.

(10) Patent No.: US 9,108,391 B2
(45) Date of Patent: Aug. 18, 2015

(54) MULTILAYER FILM AND BAG FORMED OF MULTILAYER FILM

(75) Inventors: Koichi Igarashi, Chiba (JP); Tetsuya Saito, Chiba (JP); Yasushi Nagata, Tokushima (JP); Yasuyuki Kajiwara, Tokushima (JP)

(73) Assignee: OTSUKA PHARMACEUTICAL FACTORY, INC., Tokushima (JP)

( * ) Notice: Subject to any disclaimer, the term of this patent is extended or adjusted under 35 U.S.C. 154(b) by 28 days.

(21) Appl. No.: 13/700,272

(22) PCT Filed: May 31, 2011

(86) PCT No.: PCT/JP2011/062465
§ 371 (c)(1),
(2), (4) Date: Nov. 27, 2012

(87) PCT Pub. No.: WO2011/152387
PCT Pub. Date: Dec. 8, 2011

(65) Prior Publication Data
US 2013/0071587 A1    Mar. 21, 2013

(30) Foreign Application Priority Data
May 31, 2010 (JP) .................... 2010-125284

(51) Int. Cl.
| B32B 1/02 | (2006.01) |
| B32B 27/32 | (2006.01) |
| B32B 27/08 | (2006.01) |
| B32B 7/00 | (2006.01) |
| B32B 7/02 | (2006.01) |
| B32B 27/00 | (2006.01) |
| B32B 27/06 | (2006.01) |
| A61J 1/10 | (2006.01) |

(52) U.S. Cl.
CPC . B32B 27/08 (2013.01); B32B 1/02 (2013.01); B32B 7/00 (2013.01); B32B 7/02 (2013.01); B32B 27/00 (2013.01); B32B 27/06 (2013.01); B32B 27/32 (2013.01); B32B 27/327 (2013.01); A61J 1/10 (2013.01); Y10T 428/1334 (2015.01); Y10T 428/1352 (2015.01); Y10T 428/31909 (2015.04); Y10T 428/31913 (2015.04); Y10T 428/31917 (2015.04)

(58) Field of Classification Search
CPC ........ B32B 1/02; B32B 27/32; B32B 27/327; Y10T 428/1352; Y10T 428/31909; Y10T 428/31913; Y10T 428/31917
USPC ........... 428/34.1, 34.8, 34.9, 35.2, 35.4, 35.7, 428/36.6, 36.7, 36.8, 36.91, 515–519, 521, 428/523
See application file for complete search history.

(56) References Cited

U.S. PATENT DOCUMENTS

| 5,478,617 A | 12/1995 | Watanabe et al. |
| 5,520,975 A | 5/1996 | Inoue et al. |
| 6,306,473 B1 | 10/2001 | Denpou et al. |
| 6,545,096 B1 | 4/2003 | Honda et al. |
| 6,905,744 B1 | 6/2005 | Kataoka et al. |
| 2005/0129887 A1 | 6/2005 | Yoshikawa et al. |
| 2010/0143627 A1 | 6/2010 | Inoue et al. |
| 2010/0298804 A1 | 11/2010 | Inoue et al. |
| 2012/0014625 A1 | 1/2012 | Igarashi et al. |

FOREIGN PATENT DOCUMENTS

| CN | 1626054 A | 6/2005 |
| EP | 0 634 270 A1 | 1/1995 |
| EP | 0 635 254 A1 | 1/1995 |
| EP | 1 153 742 A1 | 11/2001 |
| EP | 2 127 866 A1 | 12/2009 |
| EP | 2 174 636 A1 | 4/2010 |
| JP | 2001-172441 | 6/2001 |
| JP | 2002-238975 | 8/2002 |
| JP | 2004-358683 A | 12/2004 |
| JP | 2006-021504 | 1/2006 |
| JP | 2006-052313 | 2/2006 |
| JP | 2008-221533 A | 9/2008 |
| JP | 2009-298142 A | 12/2009 |
| WO | WO-2009/122655 A1 | 10/2009 |

OTHER PUBLICATIONS

International Search Report PCT/JP2011/062465 dated Sep. 6, 2011.
Extended European Search Report issued in European Application No. 11789790 dated Aug. 18, 2014.
Chinese Office Action dated Apr. 30, 2014 issued in Chinese Application No. 201180026785.4.
Office Action received Apr. 3, 2014 in Australian Patent Application No. 2011260914.

*Primary Examiner* — Walter B Aughenbaugh
(74) *Attorney, Agent, or Firm* — Foley & Lardner LLP

(57) ABSTRACT

A multilayer film has an upper layer (A), at least one intermediate layer (B), and a lower layer (C) stacked in that order, wherein the intermediate layer (B) includes a composition (b1) that includes a propylene polymer (p1), a propylene α-olefin random copolymer (r1) and an ethylene-based elastomer or a composition (b2), that includes a propylene α-olefin random copolymer (r2), and ethylene-based elastomer and an ethylene polymer (e1), and the upper layer (A) and the lower layer (C) each independently include an ethylene polymer and/or a propylene polymer.

7 Claims, No Drawings

MULTILAYER FILM AND BAG FORMED OF MULTILAYER FILM

TECHNICAL FIELD

The present invention relates to a multilayer film and a bag formed of the multilayer film.

BACKGROUND ART

In recent years, medical solution bags constituted by flexible plastic films have become the mainstream of containers for containing medical solutions such as infusion. Medical solution bags of this type have an advantage that they are easy to handle and easy to discard. Because medical solution bags of this type come into direct contact with medical solutions, bags formed of a polyolefin such as polyethylene or polypropylene, the safety of which has been established, are widely used.

Patent literature 1 discloses a medical container constituted by a laminate of an outer layer and an inner layer, the outer layer being formed of a metallocene-catalyzed linear low-density polyethylene or ethylene-α-olefin copolymer having a density of 0.920 to 0.930 g/cm$^3$, the inner layer being formed of a polymer composition that includes a metallocene-catalyzed linear low-density polyethylene or ethylene-α-olefin copolymer having a density of 0.890 to 0.920 g/cm$^3$, a metallocene-catalyzed linear low-density polyethylene or ethylene-α-olefin copolymer having a density of 0.920 to 0.930 g/cm$^3$, and a Ziegler-Natta-catalyzed linear low-density polyethylene or ethylene-α-olefin copolymer having a density of 0.910 to 0.930 g/cm$^3$.

Patent literature 2 discloses a heat resistant sheet formed of a polymer composition that includes 45 to 75% by weight of a metallocene-catalyzed linear polyethylene having a density of 0.928 g/cm$^3$ or more, 5 to 35% by weight of a high-pressure method low-density polyethylene, and 15 to 45% by weight of a metallocene-catalyzed linear polyethylene having a density of 0.91 g/cm$^3$ or less, and an infusion bag formed of this heat resistant sheet.

Patent literature 3 discloses a five-layer plastic film and a container formed of this plastic film, the plastic film including a seal layer comprising a mixture of a propylene-α-olefin random copolymer and a propylene homopolymer, a first flexible layer formed on a surface of the seal layer and comprising a mixture of a propylene·α-olefin random copolymer or the like and an ethylene·α-olefin copolymer elastomer, a reinforcing layer formed on a surface of the first flexible layer and comprising a propylene homopolymer, a polycyclic olefin, or the like, a second flexible layer formed on a surface of the reinforcing layer and comprising the same mixture as that of the first flexible layer, and an outermost layer formed on a surface of the second flexible layer and comprising a propylene homopolymer, a propylene·α-olefin random copolymer, or the like.

CITATION LIST

Patent Literature

Patent literature 1: JP 2002-238975 A
Patent literature 2: JP 2001-172441 A
Patent literature 3: JP 2006-21504 A

SUMMARY OF INVENTION

Technical Problem

Medical solutions such as infusion are usually subjected to a heat sterilization treatment such as high-pressure vapor sterilization or hot shower sterilization while they are contained and sealed in medical solution bags. The temperature condition for the heat sterilization treatment is about 105° C. to 110° C. in general; however, in some cases, a sterilization treatment under a high-temperature condition of 118° C. to 121° C. is needed depending on the type, usage, use environment, etc., of the medical solutions.

However, when a medical solution bag is composed of a common polyethylene, the heat resistance of the medical solution bag tends to be low and problems such as deformation, breaking, and decreased transparency of the medical solution bag occur due to a sterilization treatment under a high temperature condition.

Moreover, these problems are not sufficiently overcome even when a metallocene-catalyzed linear low-density polyethylene is used as the polyethylene as in the case of medical solution bags (medical container and infusion bag) described in patent literature 1 and 2. Accordingly, the containers described in patent literature 1 and 2 cannot be subjected to a sterilization treatment at 118 to 121° C.

When a medical solution bag is composed of a common polypropylene, the flexibility of the medical solution bag tends to be low, and thus the impact strength at low temperature is low and the bag may break due to the impact applied during transportation of the bag in a low-temperature state.

The bag described in patent literature 3 has room for improvement regarding the flexibility and the impact resistance at low temperatures.

The present invention has been made to address these problems and provides a multilayer film that maintains basic performances such as flexibility, transparency, and low-temperature impact strength, has high heat resistance that can withstand a sterilization treatment at 118 to 121° C., and retains flexibility and transparency after the sterilization treatment. A bag formed of this film, in particular, a bag for accommodating a medical solution, is also provided.

Solution to Problem

A multilayer film of the present invention is characterized by comprising an upper layer (A), at least one intermediate layer (B), and a lower layer (C) stacked in that order, in which the intermediate layer (B) comprises a composition (b1) or a composition (b2) below, and the upper layer (A) and the lower layer (C) each independently comprise an ethylene polymer and/or a propylene polymer:

Composition (b1): a composition that comprises a propylene polymer (p1) having a melting point in the range of 140 to 165° C. measured by differential scanning calorimetry and a melt flow rate (MFR; ASTM D 1238, 230° C., 2.16 kg load) in the range of 0.1 to 20 g/10 min, a propylene·α-olefin random copolymer (r1) having a molecular weight distribution in the range of 1.0 to 3.5 determined by gel permeation chromatography (GPC) and a melting point in the range of 90 to 125° C. measured by differential scanning calorimetry, and 30% by weight to 60% by weight of an ethylene-based elastomer (where the sum of the contents of the propylene polymer (p1), the propylene·α-olefin random copolymer (r1), and the ethylene-based elastomer is 100% by weight)

(when the intermediate layer (B) is composed of the composition (b1), the ratio of the content of the propylene polymer (p1) in the entire multilayer film to the sum of the contents of the propylene polymer (p1) and the propylene·α-olefin random copolymer (r1) in the entire multilayer film is 0.1 to 0.35);

Composition (b2): a composition that comprises 20 to 55% by weight of a propylene·α-olefin random copolymer (r2) having a melting point in the range of 125 to 145° C. measured by differential scanning calorimetry, 35 to 60% by weight of an ethylene-based elastomer, and 6 to 25% by weight of an ethylene polymer (e1) having a density in the range of 0.950 to 0.970 g/cm³ and a melt flow rate (MFR; ASTM D 1238, 190° C., 2.16 kg load) in the range of 0.1 to 20 g/10 min (where the sum of the contents of the propylene·α-olefin random copolymer (r2), the ethylene-based elastomer, and the ethylene polymer (e1) is 100% by weight).

The composition (b1) is preferably a composition (b1') below:

Composition (b1'): a composition that comprises 3 to 20% by weight of a propylene polymer (p1) that has a melting point in the range of 140 to 165° C. measured by differential scanning calorimetry and a melt flow rate (MFR; ASTM D 1238, 230° C., 2.16 kg load) in the range of 0.1 to 20 g/10 min, 25 to 65% by weight of a propylene·α-olefin random copolymer (r1) that has a molecular weight distribution in the range of 1.0 to 3.5 measured by gel permeation chromatography (GPC) and a melting point in the range of 90 to 125° C. determined by differential scanning calorimetry, 0 to 25% by weight of a propylene-based elastomer, 30 to 60% by weight of an ethylene-based elastomer, and 0 to 15% by weight of an ethylene polymer (e1) having a density in the range of 0.950 to 0.970 g/cm³ and a melt flow rate (MFR; ASTM D 1238, 190° C., 2.16 kg load) in the range of 0.1 to 20 g/10 min (where the sum of the contents of the propylene polymer (p1), the propylene·α-olefin random copolymer (r1), the propylene-based elastomer, the ethylene-based elastomer, and the ethylene polymer (e1) is 100% by weight).

The upper layer (A) preferably comprises a composition (a1) below or a propylene polymer (p1) below:

Composition (a1): a composition that comprises 5 to 55% by weight of a propylene polymer (p1) that has a melting point in the range of 140 to 165° C. measured by differential scanning calorimetry and a melt flow rate (MFR; ASTM D 1238, 230° C., 2.16 kg load) in the range of 0.1 to 20 g/10 min, and 45 to 95% by weight of a propylene·α-olefin random copolymer (r1) having a molecular weight distribution in the range of 1.0 to 3.5 determined by gel permeation chromatography (GPC) and a melting point in the range of 90 to 125° C. measured by differential scanning calorimetry (where the sum of the contents of the propylene polymer (p1) and the propylene·α-olefin random copolymer (r1) is 100% by weight);

Propylene polymer (p1): a propylene polymer that has a melting point in the range of 140 to 165° C. measured by differential scanning calorimetry and a melt flow rate (MFR; ASTM D 1238, 230° C., 2.16 kg load) in the range of 0.1 to 20 g/10 min.

The lower layer (C) preferably comprises a composition (c1) below or a composition (c2) below:

Composition (c1): a composition that comprises 5 to 30% by weight of a propylene polymer (p1) that has a melting point in the range of 140 to 165° C. measured by differential scanning calorimetry and a melt flow rate (MFR; ASTM D 1238, 230° C., 2.16 kg load) in the range of 0.1 to 20 g/10 min, 45 to 70% by weight of a propylene·α-olefin random copolymer (r1) that has a molecular weight distribution in the range of 1.0 to 3.5 measured by gel permeation chromatography (GPC) and a melting point in the range of 90 to 125° C. measured by differential scanning calorimetry, and 20 to 50% by weight of an ethylene-based elastomer (where the sum of the contents of the propylene polymer (p1), the propylene·α-olefin random copolymer (r1), and the ethylene-based elastomer is 100% by weight);

Composition (c2): a composition that comprises 25 to 60% by weight of a linear polyethylene having a density in the range of 0.916 to 0.940 g/cm³, 10 to 30% by weight of a high-density polyethylene having a density in the range of 0.950 to 0.970 g/cm³, and 20 to 45% by weight of a single-site-catalyzed linear polyethylene having a density in the range of 0.900 to 0.910 g/cm³ (where the sum of the contents of the linear polyethylene, the high-density polyethylene, and the single-site-catalyzed linear polyethylene is 100% by weight).

An example of the multilayer film of the present invention is a multilayer film comprising the upper layer (A), the intermediate layer (B), an intermediate layer (B-1), the intermediate layer (B), and the lower layer (C) stacked in that order, and the intermediate layer (B-1) comprises a composition (b-11) below or a composition (b-12) below:

Composition (b-11): a composition that comprises 5 to 35% by weight of propylene polymer (p1) that has a melting point in the range of 140 to 165° C. measured by differential scanning calorimetry and a melt flow rate (MFR; ASTM D 1238, 230° C., 2.16 kg load) in the range of 0.1 to 20 g/10 min, 50 to 90% by weight of a propylene·α-olefin random copolymer (r1) that has a molecular weight distribution in the range of 1.0 to 3.5 measured by gel permeation chromatography (GPC) and a melting point in the range of 90 to 125° C. measured by differential scanning calorimetry, and 5 to 45% by weight of an ethylene-based elastomer (where the sum of the contents of the propylene polymer (p1), the propylene·α-olefin random copolymer (r1), and the ethylene-based elastomer is 100% by weight);

Composition (b-12): a composition that comprises 60 to 90% by weight of a propylene·α-olefin random copolymer (r2) having a melting point in the range of 125 to 145° C. measured by differential scanning calorimetry, and 10 to 40% by weight of an ethylene-based elastomer (where the total of the contents of the propylene·α-olefin random copolymer (r2) and the ethylene-based elastomer is 100% by weight).

The multilayer film of the present invention is preferably a multilayer film comprising an upper layer (A), an intermediate layer (B), and a lower layer (C) stacked in that order, in which the upper layer (A) comprises the composition (a1), the intermediate layer (B) comprises the composition (b1'), and the lower layer (C) comprises the composition (c1).

The multilayer film of the present invention is preferably a multilayer film comprising an upper layer (A), an intermediate layer (B), an intermediate layer (B-1), an intermediate layer (B), and a lower layer (C) stacked in that order, in which the upper layer (A) comprises the composition (a1) that comprises 15 to 35% by weight of the propylene polymer (p1) and 65 to 85% by weight of the propylene·α-olefin random copolymer (r1), the intermediate layer (B) comprises the composition (b1'), the intermediate layer (B-1) comprises the composition (b-11), and the lower layer (C) comprises the composition (c2).

The multilayer film of the present invention is preferably a multilayer film comprising an upper layer (A), an intermediate layer (B), an intermediate layer (B-1), an intermediate layer (B), and a lower layer (C) stacked in that order, in which the upper layer (A) comprises the propylene polymer (p1), each of the intermediate layers (B) comprises the composition (b2), the intermediate layer (B-1) comprises the composition (b-12), and the lower layer (C) comprises the composition (c2).

A bag according to the present invention is formed of the multilayer film, in which the lower layer (C) is positioned at a surface that comes into contact with contents.

Advantageous Effects of Invention

A multilayer film of the present invention has excellent transparency, heat resistance, flexibility, mechanical strength, and low-temperature impact resistance.

Thus a bag formed of this multilayer film has excellent characteristics such as transparency, flexibility, heat resistance, mechanical strength, and low-temperature impact resistance. In particular, since the bag according to the present invention has excellent heat resistance, it can be subjected to a sterilization treatment at a high temperature (121° C.), wrinkles and degradation of transparency barely occur and an adequate degree of flexibility and good transparency can be maintained even after the sterilization treatment at high temperature. Thus, the bag is suitable for use as a medical solution bag. Moreover, the bag according to the present invention has particularly good low-temperature impact resistance and can sufficiently withstand use in a low-temperature environment or transportation in a low-temperature environment. Thus, the bag is suitable for use as a medical solution bag.

DESCRIPTION OF EMBODIMENTS

<<Multilayer Film>>

A multilayer film according to the present invention comprises an upper layer (A), at least one intermediate layer (B), and a lower layer (C) stacked in that order. More specific examples of this multilayer film include a multilayer film (X) that comprises an upper layer (A), an intermediate layer (B), and a lower layer (C) stacked in that order, and a multilayer film (Y) that comprises an upper layer (A), an intermediate layer (B), an intermediate layer (B-1), an intermediate layer (B), and a lower layer (C) stacked in that order.

The thickness of the multilayer film is, for example, 160 to 300 μm and preferably 180 to 260 μm if the multilayer film is to be used in a bag such as a medical solution bag.

[Upper Layer (A)]

The upper layer (A) comprises an ethylene polymer and/or a propylene polymer and preferably a composition (a1) or propylene polymer (p1) described below.

The upper layer (A) particularly contributes to the heat resistance of the multilayer film.

The ethylene polymer is a polymer having an ethylene-derived constitutional unit (hereinafter referred to as "ethylene unit") as the main constitutional unit in the polymer. The ethylene polymer is preferably an ethylene homopolymer or an ethylene·α-olefin random copolymer comprising a small amount, e.g., 10 mol % or less and preferably 5 mol % or less, of a constitutional unit derived from an α-olefin having 3 to 20 carbon atoms.

The propylene polymer is a polymer having a propylene-derived constitutional unit (hereinafter referred to as "propylene unit") as the main constitutional unit in the polymer. Examples of the propylene polymer include a propylene homopolymer and a propylene·α-olefin random copolymer comprising a small amount, e.g., 10 mol % or less and preferably 5 mol % or less, of a constitutional unit derived from an α-olefin having 2 or 4 to 20 carbon atoms. A propylene polymer (p1) described below is more preferable.

{Composition (a1)}

A composition (a1) is a composition that comprises 5 to 55% by weight, preferably 15 to 50% by weight, and more preferably 20 to 45% by weight of a propylene polymer (p1) having a melting point in the range of 140° C. to 165° C. measured by differential scanning calorimetry and a melt flow rate (MFR; ASTM D 1238, 230° C., 2.16 kg load) in the range of 0.1 to 20 g/10 min; and 45 to 95% by weight, preferably 55 to 85% by weight, and more preferably 60 to 80% by weight of a propylene·α-olefin random copolymer (r1) having a molecular weight distribution in the range of 1.0 to 3.5 determined by gel permeation chromatography (GPC) and a melting point in the range of 90 to 125° C. measured by differential scanning calorimetry (where the sum of the contents of the propylene polymer (p1) and the propylene·α-olefin random copolymer (r1) is 100% by weight).

When the upper layer (A) comprises the composition (a1), the multilayer film of the present invention is excellent particularly in terms of heat resistance, transparency, low-temperature impact resistance, etc.

The melting point of the propylene polymer (p1) measured by differential scanning calorimetry is in the range of 140 to 165° C., preferably 145 to 165° C., and more preferably 155 to 165° C. The melt flow rate (MFR; ASTM D 1238, 230° C., 2.16 kg load) is in the range of 0.1 to 20 g/10 min, preferably 1 to 10 g/10 min, and more preferably 2 to 5 g/10 min.

The propylene polymer (p1) is preferably a propylene homopolymer or a propylene·α-olefin random copolymer comprising a small amount (e.g., 10 mol % or less and preferably 5 mol % or less) of a constitutional unit derived from an α-olefin having 2 or 4 to 20 carbon atoms, and is more preferably a propylene homopolymer.

This propylene polymer (p1) can be produced by using a Ziegler-Matta catalyst, for example, but the production method is not particularly limited.

The propylene polymer (p1) may be one or a mixture of two or more propylene polymers.

Examples of the propylene polymer (p1) include propylene polymers known in the art. Examples of the commercial product include J103WA produced by Prime Polymer Co., Ltd.

The propylene·α-olefin random copolymer (r1) has a molecular weight distribution (Mw/Mn, polystyrene equivalent, Mw: weight-average molecular weight, Mn: number-average molecular weight) in the range of 1.0 to 3.5, preferably 1.0 to 3.0, and more preferably 2.0 to 3.0 measured by GPC and a melting point in the range of 90 to 125° C. and preferably 100 to 120° C. measured by differential scanning calorimetry.

The melt flow rate (MFR; ASTM D 1238, 230° C., 2.16 kg load) of the propylene·α-olefin random copolymer (r1) is usually 0.1 to 20 g/10 min, preferably 1 to 15 g/10 min, and more preferably 1 to 8 g/10 min.

The propylene·α-olefin random copolymer (r1) comprises a copolymer of propylene and an α-olefin having 2 or 4 to 20 carbon atoms. Specific examples of the α-olefin having 2 or 4 to 20 carbon atoms include ethylene, 1-butene, 1-pentene, 1-hexene, 4-methyl-1-pentene, 1-heptene, 1-octene, 1-nonene, 1-decene, 1-undecene, 1-dodecene, 1-tridecene, 1-tetradecene, 1-hexadecene, 1-octadecene, and 1-eicosene. Of these, ethylene and 1-butene are preferable. These α-olefins can be used alone or in combination of two or more.

The propylene·α-olefin random copolymer (r1) preferably contains 50 to 89 mol %, more preferably 50 to 80 mol %, and yet more preferably 50 to 75 mol % of the propylene unit and 1 to 10 mol %, preferably 2 to 8 mol %, and more preferably 3 to 5 mol % of the α-olefin unit.

The propylene·α-olefin random copolymer (r1) is preferably a metallocene-catalyzed propylene·α-olefin random copolymer. In particular, examples thereof include a crystalline propylene·ethylene copolymer, a crystalline propylene·ethylene·1-butene copolymer, a crystalline propylene·1-butene copolymer, a propylene·1-octene copolymer, and a propylene·1-hexene copolymer. Among these, a crystalline propylene·ethylene copolymer and a crystalline propylene·ethylene·1-butene copolymer are preferable.

The propylene·α-olefin random copolymer (r1) can be produced by a known method for producing a propylene (co)polymer in the presence of a metallocene catalyst. A polymerization in the presence of a metallocene catalyst easily gives a propylene·α-olefin random copolymer having a small molecular weight distribution.

Examples of the metallocene catalyst include known metallocene catalysts such as group 4 transition metal compounds (what is called metallocene compounds) that comprises a ligand having a cyclopentadienyl skeleton, such as dimethylsilylenebis(2-methylindenyl)zirconium dichloride; an organoaluminoxy compound such as methyl aluminoxane; boron compounds such as N,N-dimethylanilinium tetrakis(pentafluorophenyl)borate; and a catalyst comprising an organoaluminum compound such as triethyl aluminum or the like used as needed and a promoter that reacts with a reaction product between pentafluorophenol and an organic metal compound or a metallocene compound such as ion-exchange layered silicate or the like to activate into a stable ionic state.

Note that the propylene·α-olefin random copolymer (r1) can be produced by using a known Ziegler-Natta catalyst; in such a case, a step of pyrolyzing the propylene·α-olefin random copolymer produced by using a known Ziegler-Natta catalyst in the presence of an organic peroxide is needed in order to bring the molecular weight distribution to 3.5 or less.

The propylene·α-olefin random copolymer (r1) may be one or mixture of two or more propylene·α-olefin random copolymers.

A known propylene·α-olefin random copolymer can be used as the propylene·α-olefin random copolymer (r1).

The composition (a1) can be prepared from the above-described individual components in the above-described contents by employing any of various known methods. For example, a multistage polymerization method, a mixing method using a Henschel mixer, a V-blender, a ribbon blender, a tumbler blender, or the like, or a method including melt-kneading a mixture with a single-screw extruder, a twin-screw extruder, a kneader, a Banbury mixer, or the like, and agglomerating or pulverizing the resulting mixture.

When the multilayer film according to the present invention is used in a bag such as a medical solution bag, no additive is preferably added to each layer; however, for other usages, additives such as a weather-resistant stabilizer, a heat-resistant stabilizer, an antistatic agent, an anti-slip agent, an anti-blocking agent, an anti-fogging agent, a lubricant, a plasticizer, an anti-aging agent, a hydrochloric acid absorber, and an antioxidant and the like can be further added to the composition (a1) as needed as long as the purpose of the present invention is not impaired.

{Propylene Polymer (p1)}

The propylene polymer (p1) is a propylene polymer that has a melting point in the range of 140 to 165° C. measured by differential scanning calorimetry and a melt flow rate (MFR; ASTM D 1238, 230° C., 2.16 kg load) in the range of 0.1 to 20 g/10 min. The details thereof are as described above.

When the upper layer (A) comprises the composition (a1), the multilayer film according to the present invention is particularly excellent in terms of heat resistance, mechanical strength, etc.

Additives similar to the additives that can be added to the composition (a1) may be added to the propylene polymer (p1).

The thickness of the upper layer (A) is not particularly limited but is preferably 5 to 20% of the total thickness of the multilayer film and is preferably 10 to 40 μm and more preferably 15 to 35 μm in order to use the multilayer film of the present invention in a bag such as a medical solution bag. A multilayer film in which the properties of the upper layer (A) are fully exhibited can be obtained when the thickness of the upper layer (A) is within such a range.

[Intermediate Layer (B)]

The intermediate layer (B) comprises a composition (b1) or a composition (b2) below. One or more and preferably one or two intermediate layers (B) are included in the multilayer film of the present invention.

The intermediate layer (B) particularly contributes to the transparency, flexibility, impact resistance, etc., of the multilayer film and also contributes to improving the adhesion between layers.

{Composition (b1)}

The composition (b1) is a composition that comprises the propylene polymer (p1), the propylene·α-olefin random copolymer (r1), and 30% by weight to 60% by weight of an ethylene-based elastomer (where the sum of the contents of the propylene polymer (p1), the propylene·α-olefin random copolymer (r1), and the ethylene-based elastomer is 100% by weight).

When the intermediate layer (B) is composed of the composition (b1), the ratio of the content of the propylene polymer (p1) in the entire multilayer film to the sum of the contents of the propylene polymer (p1) and the propylene·α-olefin random copolymer (r1) in the entire multilayer film is 0.1 to 0.35, preferably 0.1 to 0.33, and more preferably 0.2 to 0.32

When the intermediate layer (B) comprises the composition (b1), a multilayer film of the present invention is excellent particularly in terms of heat resistance and transparency and has a good balance between the transparency and the low-temperature impact resistance.

The details of the propylene polymer (p1) and the propylene·α-olefin random copolymer (r1) are as described above. Preferably, a polymer having a MFR of 0.1 to 10 g/10 min is used as the propylene polymer (p1).

The details of the ethylene-based elastomer are as described below.

The method for preparing the composition (b1) is the same as that of the composition (a1), and additives similar to the additives that can be added to the composition (a1) may be added to the composition (b1).

{Composition (b1')}

The composition (b1) is preferably the following composition (b1').

The composition (b1') is a composition that comprises 3 to 20% by weight, preferably 5 to 18% by weight, and more preferably 6 to 15% by weight of the propylene polymer (p1), 25 to 65% by weight, preferably 25 to 60% by weight, and more preferably 30 to 55% by weight of the propylene·α-olefin random copolymer (r1), 0 to 25% by weight, preferably 3 to 15% by weight, and more preferably 5 to 10% by weight of a propylene-based elastomer, 30 to 60% by weight, preferably 35 to 55% by weight, and more preferably 35 to 50% by weight of the ethylene-based elastomer, and 0 to 15% by weight, preferably 5 to 15% by weight, and more preferably 10 to 15% by weight of an ethylene polymer (e1) having a density in the range of 0.950 to 0.970 g/cm$^3$ and a melt flow rate (MFR; ASTM D 1238, 190° C., 2.16 kg load) in the range of 0.1 to 20 g/10 min (where the sum of the contents of the propylene polymer (p1), the propylene·α-olefin random copolymer (r1), the propylene-based elastomer, the ethylene-based elastomer, and the ethylene polymer (e1) is 100% by weight).

When the intermediate layer (B) comprises the composition (b1'), a multilayer film of the present invention is excellent particularly in terms of heat resistance, transparency, interlayer adhesion, and the like, and has a good balance between transparency and low-temperature impact resistance.

The details of the propylene polymer (p1) and the propylene·α-olefin random copolymer (r1) are as described above.

The propylene-based elastomer is a propylene·α-olefin copolymer mainly comprising propylene and preferably contains 50 to 89 mol %, more preferably 50 to 80 mol %, and yet more preferably 50 to 75 mol % of a propylene unit, preferably 10 to 25 mol %, more preferably 10 to 23 mol %, and yet more preferably 12 to 23 mol % of an ethylene unit, and, if needed, preferably 0 to 30 mol %, more preferably 0 to 25 mol %, and yet more preferably 0 to 20 mol % of an α-olefin unit having 4 to 20 carbon atoms.

Examples of the α-olefin include α-olefins having 4 to 20 carbon atoms such as 1-butene, 1-pentene, 1-hexene, 4-methyl-1-pentene, 1-heptene, 1-octene, 1-nonene, 1-decene, 1-undecene, 1-dodecene, 1-tridecene, 1-tetradecene, 1-hexadecene, 1-octadecene, and 1-eicosene. These α-olefins may be used alone or in combination of two or more. Among these examples, the α-olefin is preferably 1-butene, 1-pentene, 1-hexene, 4-methyl-1-pentene, 1-heptene, or a 1-octene and more preferably 1-butene, 1-pentene, 1-hexene, or 4-methyl-1-pentene, and yet more preferably 1-butene.

This propylene-based elastomer preferably has a limiting viscosity [η] in the range of usually 0.01 to 10 dl/g and preferably 0.05 to 10 dl/g measured in 135° C. decalin.

The stress measured at 100% strain (M100) of the propylene elastomer measured in accordance with JIS K6301 using a JIS No. 3 dumbbell specimen with an span distance: 30 mm, tensile rate: 30 mm/min, at 23° C. is preferably 4 Mpa or less, more preferably 3 Mpa or less, and yet more preferably 2 Mpa or less.

The crystallinity of the propylene-based elastomer measured by X-ray diffraction is preferably 20% or less and more preferably 0 to 15%. Preferably, the propylene-based elastomer has a single glass transition temperature, and the grass transition temperature Tg measured with a differential scanning calorimeter (DSC) is in the range of usually −10° C. or less and preferably −15° C. or less.

The molecular weight distribution (Mw/Mn, polystyrene equivalent, Mw: weight-average molecular weight, Mn: number-average molecular weight) measured by GPC is preferably 4.0 or less, more preferably 3.0 or less, and yet more preferably 2.5 or less.

Usually 1 to 100 parts by weight and preferably 5 to 80 parts by weight of the propylene-based elastomer relative to 100 parts by weight of the propylene-based elastomer may be graft-modified with a polar monomer. Examples of the polar monomer include a hydroxyl-group-containing ethylenic unsaturated compound, an amino-group-containing ethylenic unsaturated compound, an epoxy-group-containing ethylenic unsaturated compound, an aromatic vinyl compound, an unsaturated carboxylic acid or a derivative thereof, a vinyl ester compound, and vinyl chloride.

The propylene-based elastomer can be produced by using the metallocene catalyst but is not limited to this.

These propylene-based elastomers may be used alone or in combination of two or more.

A known propylene-based elastomer can be used as the propylene-based elastomer. An example of the commercial product thereof is XM-7070 (produced by Mitsui Chemicals Inc.).

An ethylene·α-olefin random copolymer is preferably used as the ethylene-based elastomer.

This ethylene·α-olefin random copolymer is usually a copolymer of ethylene and an α-olefin having 3 to 20 carbon atoms and preferably a copolymer of ethylene and an α-olefin having 3 to 10 carbon atoms. The ethylene·α-olefin random copolymer preferably satisfies (x) and (y) below.

(x): Density (ASTM 1505, temperature: 23° C.) of 0.850 to 0.910 g/cm$^3$, preferably 0.860 to 0.905 g/cm$^3$, and more preferably 0.865 to 0.895 g/cm$^3$ (y): Melt flow rate (MFR, temperature: 190° C., under a 2.16 kg load) of 0.1 to 150 g/10 min and preferably 0.3 to 100 g/10 min.

The crystallinity of the ethylene·α-olefin random copolymer measured by X-ray diffraction is usually 40% or less, preferably 0 to 39%, and more preferably 0 to 35%.

Examples of the α-olefin having 3 to 20 carbon atoms used as the comonomer include propylene, 1-butene, 1-pentene, 1-hexene, 4-methyl-1-pentene, 1-octene, 1-decene, and 1-dodecene. These may be used alone or in combination. Among these, propylene, 1-butene, 1-hexene and 1-octene are preferable.

The α-olefin content in the copolymer is usually 3 to 39 mol %, preferably 5 to 30 mol %, and more preferably 5 to 25 mol %.

If needed, other comonomers, e.g., a diene such as 1,6-hexadiene or 1,8-octadiene or a cyclic olefin such as cyclopentene may be contained in small amounts.

The molecular structure of the copolymer may be linear or branched with long or short side chains.

It is also possible to use a mixture of different types of ethylene·α-olefin random copolymers.

The method for obtaining such an ethylene·α-olefin random copolymer is not particularly limited and an example thereof is a known production method that uses a vanadium-based catalyst, a titanium-based catalyst, or a metallocene-based catalyst. In particular, a copolymer produced by using a metallocene catalyst usually has a molecular weight distribution (Mw/Mn) of 3 or less and suited for use in the present invention.

The ethylene-based elastomers may be used alone or in combination of two or more.

A known ethylene-based elastomer can be used as the ethylene-based elastomer. An example of the commercial product is TAFMER (registered trademark) A0585X (produced by Mitsui Chemicals, Inc.).

The ethylene polymer (e1) has a density in the range of 0.950 to 0.970 g/cm$^3$, preferably 0.953 to 0.968 g/cm$^3$, and more preferably 0.955 to 0.965 g/cm$^3$ and a melt flow rate (MFR; ASTM D 1238, 190° C., 2.16 kg load) in the range of 0.1 to 20 g/10 min, preferably 1 to 18 g/10 min, and more preferably 3 to 17 g/10 min.

The ethylene polymer (e1) is preferably an ethylene homopolymer or an ethylene·α-olefin random copolymer containing a small amount (e.g., 10 mol % or less and preferably 5 mol % or less) of a constitutional unit derived from an α-olefin having 3 to 20 carbon atoms, and is more preferably an ethylene homopolymer.

The ethylene polymer (e1) may be one or a mixture of two or more of ethylene polymers.

A known ethylene polymer can be used as the ethylene polymer (e1).

The method for preparing the composition (b1') is the same as that of the composition (a1), and additives similar to the additives that can be added to the composition (a1) may be added to the composition (b1').

{Composition (b2)}

The composition (b2) is a composition that comprises 20 to 55% by weight, preferably 30 to 50% by weight, and more preferably 35 to 45% by weight of a propylene·α-olefin random copolymer (r2) having a melting point in the range of 125 to 145° C. measured by differential scanning calorimetry, 35 to 60% by weight, preferably 40 to 60% by weight, and more preferably 45 to 55% by weight of an ethylene-based elastomer, and 6 to 25% by weight, preferably 6 to 20% by weight, and more preferably 7 to 15% by weight of the ethylene polymer (e1) (where the total of the contents of the propylene·α-olefin random copolymer (r2), the ethylene-based elastomer, and the ethylene polymer (e1) is 100% by weight).

When the intermediate layer (B) comprises the composition (b2), a multilayer film of the present invention is particularly excellent in terms of low-temperature impact resistance or the like.

The propylene·α-olefin random copolymer (r2) comprises a copolymer of propylene and an α-olefin having 2 or 4 to 20 carbon atoms. Examples of the α-olefin having 2 or 4 to 20 carbon atoms include ethylene, 1-butene, 1-pentene, 1-hexene, 4-methyl-1-pentene, 1-heptene, 1-octene, 1-nonene, 1-decene, 1-undecene, 1-dodecene, 1-tridecene, 1-tetradecene, 1-hexadecene, 1-octadecene, and 1-eicosene. Of these, ethylene and 1-butene are preferable. These α-olefins can be used alone or in combination.

The propylene·α-olefin random copolymer (r2) contains preferably 75 to 99 mol %, more preferably 80 to 97 mol %, and yet more preferably 85 to 95 mol % of the propylene unit and preferably 1 to 25 mol %, more preferably 3 to 20 mol %, and yet more preferably 5 to 15 mol % of the α-olefin unit.

Specific examples of the propylene·α-olefin random copolymer (r2) include crystalline propylene·ethylene copolymer, a crystalline propylene·ethylene·1-butene copolymer, a crystalline propylene·1-butene copolymer, a propylene·1-octene copolymer, and a propylene·1-hexene copolymer. Among these, a crystalline propylene·ethylene copolymer and a crystalline propylene·ethylene·1-butene copolymer are preferable.

The propylene·α-olefin random copolymer (r2) can be produced by a known method for producing a propylene (co)polymer by using a Ziegler-Natta catalyst.

The propylene·α-olefin random copolymer (r2) may be one or a mixture of two or more of propylene·α-olefin random copolymers.

A known propylene·α-olefin random copolymer can be used as the propylene·α-olefin random copolymer (r2).

The details of the ethylene-based elastomer and the ethylene polymer (e1) are as described above.

The method for preparing the composition (b2) is the same as that of the composition (a1) and additives similar to the additives that can be added to the composition (a1) may be added to the composition (b2).

When the intermediate layer (B) is included in the multilayer film (X), the thickness of the layer (B) is not particularly limited but is preferably 60 to 90% of the total thickness of the multilayer film (X) and is preferably 140 to 220μm and more preferably 160 to 220 μm when the multilayer film (X) is used in a bag such as a medical solution bag or the like. When the intermediate layer (B) is included in the multilayer film (Y), the thickness of one intermediate layer (B) is preferably 30 to 40% of the total thickness of the multilayer film (Y) and is preferably 70 to 110 μm and more preferably 80 to 110 μm when the multilayer film (Y) is used in a bag such as a medical solution bag.

A multilayer film in which the properties of the intermediate layer (B) are fully exhibited can be obtained when the thickness of the intermediate layer (B) is within such a range.

[Intermediate Layer (B-1)]

The intermediate layer (B-1) comprises a composition (b-11) or a composition (b-12) below.

The intermediate layer (B-1) particularly contributes to the mechanical strength of the multilayer film.

{Composition (b-11)}

The composition (b-11) is a composition that comprises 5 to 35% by weight, preferably 5 to 30% by weight, and more preferably 10 to 25% by weight of the propylene polymer (p1), 50 to 90% by weight, preferably 55 to 80% by weight, and more preferably 55 to 75% by weight of the propylene·α-olefin random copolymer (r1), and 5 to 45% by weight, preferably 5 to 40% by weight, and more preferably 10 to 30% by weight of the ethylene-based elastomer (where the sum of the contents of the propylene polymer (p1), the propylene·α-olefin random copolymer (r1), and the ethylene-based elastomer is 100% by weight).

When the intermediate layer (B-1) comprises the composition (b-11), a multilayer film of the present invention is excellent particularly in terms of mechanical strength or the like.

The details of the propylene polymer (p1), the propylene·α-olefin random copolymer (r1), and the ethylene-based elastomer are as described above.

The method for preparing the composition (b-11) is the same as that of the composition (a1), and additives similar to the additives that can be added to the composition (a1) may be added to the composition (b-11).

{Composition (b-12)}

The composition (b-12) is a composition that comprises 60 to 90% by weight and preferably 70 to 90% by weight of the propylene·α-olefin random copolymer (r2), and 10 to 40% by weight, preferably 10 to 35% by weight, and more preferably 10 to 30% by weight of the ethylene-based elastomer (where the sum of the contents of the propylene·α-olefin random copolymer (r2) and the ethylene-based elastomer is 100% by weight).

When the intermediate layer (B-1) comprises the composition (b-12), a multilayer film of the present invention is excellent particularly in terms of mechanical strength of the like.

The details of the propylene·α-olefin random copolymer (r2) and the ethylene-based elastomer are as described above.

The method for preparing the composition (b-12) is the same as that of the composition (a1), and additives similar to the additives that can be added to the composition (a1) may be added to the composition (b-12).

The thickness of the intermediate layer (B-1) is not particularly limited but is preferably 5 to 20% of the total thickness of the multilayer film. The thickness is preferably 5 to 35 µm and more preferably 10 to 30 µm when the multilayer film of the present invention is used in a bag such as a medical solution bag. A multilayer film in which the properties of the intermediate layer (B-1) are fully exhibited can be obtained when the thickness of the intermediate layer (B-1) is within such a range.

[Lower Layer (C)]

The lower layer (C) comprises an ethylene polymer and/or a propylene polymer and preferably comprises a composition (c1) or a composition (c2) below.

The lower layer (C) particularly contributes to the low-temperature impact resistance of a multilayer film.

The ethylene polymer is a polymer comprising an ethylene unit as a main constitutional unit in the polymer. Examples of the ethylene polymer include an ethylene homopolymer and an ethylene·α-olefin random copolymer comprising a small amount, e.g., 10 mol % or less and preferably 5 mol % or less, of a constitutional unit derived from an α-olefin having 3 to 20 carbon atoms.

The propylene polymer is a polymer comprising a propylene unit as a main constitutional unit in the polymer. Examples of the propylene polymer include a propylene homopolymer and a propylene·α-olefin random copolymer comprising a small amount, e.g., 10 mol % or less and preferably 5 mol % or less, of a constitutional unit derived form an α-olefin having 2 or 4 to 20 carbon atoms.

{Composition (c1)}

The composition (c1) is a composition that comprises 5 to 30% by weight, preferably 5 to 25% by weight, and more preferably 10 to 20% by weight of the propylene polymer ($p^1$), 45 to 70% by weight of the propylene·α-olefin random copolymer (r1), and 20 to 50% by weight, preferably 20 to 45% by weight, and more preferably 25 to 40% by weight of the ethylene-based elastomer (where the sum of the contents of the propylene polymer (p1), the propylene·α-olefin random copolymer (r1), and the ethylene-based elastomer is 100% by weight).

When the lower layer (C) comprises the composition (c1), a multilayer film of the present invention is excellent particularly in terms of heat resistance, transparency, or the like.

The details of the propylene polymer (p1), the propylene·α-olefin random copolymer (r1), and the ethylene-based elastomer are as described above.

The method for preparing the composition (c1) is the same as that of the composition (a1), and additives similar to the additives that can be added to the composition (a1) may be added to the composition (c1).

{Composition (c2)}

The composition (c2) is a composition that comprises 25 to 60% by weight and preferably 25 to 50% by weight of a linear polyethylene having a density in the range of 0.916 to 0.940 g/cm$^3$, 10 to 30% by weight, preferably 13 to 28% by weight, and more preferably 15 to 25% by weight of a high-density polyethylene having a density in the range of 0.950 to 0.970 g/cm$^3$, and 20 to 45% by weight, preferably 25 to 45% by weight, and more preferably 30 to 45% by weight of a single-site-catalyzed linear polyethylene having a density in the range of 0.900 to 0.910 g/cm$^3$ (where the sum of the contents of the linear polyethylene, the high-density polyethylene and the single-site-catalyzed linear polyethylene is 100% by weight).

When the lower layer (C) comprises the composition (c2), a multilayer film of the present invention is excellent particularly in terms of low-temperature impact resistance or the like.

The linear polyethylene has a density in the range of 0.916 to 0.940 g/cm$^3$, preferably 0.918 to 0.940 g/cm$^3$, and more preferably 0.920 to 0.940 g/cm$^3$.

Examples of the linear polyethylene include an ethylene-α-olefin copolymer.

Examples of the α-olefin in the ethylene-α-olefin copolymer include α-olefins having 3 to 12 carbon atoms such as propylene, 1-butene, 1-pentene, 1-hexene, 4-methyl-1-pentene, 1-heptene, 1-octene, 1-nonene, 1-decene, 1-undecene, and 1-dodecene. These α-olefins may be used alone or in combination of two or more. Among the examples above, the α-olefin is preferably 1-butene, 1-pentene, 1-hexene, 4-methyl-1-pentene, 1-heptene, or 1-octene and is more preferably 1-butene, 1-pentene, 1-hexene, or 4-methyl-1-pentene. The α-olefin content in the ethylene-α-olefin copolymer is adequately set in accordance with the density required for the ethylene-α-olefin copolymer.

Such a linear polyethylene can be produced by copolymerization of ethylene and an α-olefin in the presence of an olefin stereoregular polymerization catalyst such as a Ziegler-Natta-type polymerization catalyst.

These linear polyethylenes may be used alone or in combination of two or more.

A known linear polyethylene can be used as the linear polyethylene.

The high-density polyethylene has a density in the range of 0.950 to 0.970 g/cm$^3$, preferably 0.953 to 0.968 g/cm$^3$, and more preferably 0.955 to 0.965 g/cm$^3$.

Such a high-density polyethylene can be produced by copolymerization of ethylene and an α-olefin in the presence of a known Ziegler-Natta-type polymerization catalyst.

The high-density polyethylene may be one high-density polyethylene or a mixture of two or more high-density polyethylenes.

A known high-density polyethylene can be used as the high-density polyethylene. The high-density polyethylene may be the same compound as the ethylene polymer (e1) described above.

The single-site-catalyzed linear polyethylene has a density in the range of 0.900 to 0.910 g/cm$^3$, preferably 0.901 to 0.909 g/cm$^3$, and more preferably 0.902 to 0.908 g/cm$^3$.

More specifically, such a single-site-catalyzed linear polyethylene can be produced by copolymerizing ethylene and an α-olefin in the presence of a single site catalyst such as a metallocene catalyst the same as one described above.

The single-site-catalyzed linear polyethylene may be one or a mixture of two or more of the linear polyethylenes.

A known single-site-catalyzed linear polyethylene can be used as the linear single-site-catalyzed polyethylene.

The method for preparing the composition (c2) is the same as that of the composition (a1), and additives similar to the additives that can be added to the composition (a1) may be added to the composition (c2).

The thickness of the lower layer (C) is not particularly limited but is preferably 5 to 20% of the total thickness of the multilayer film, and is preferably 10 to 40 µm and more preferably 15 to 35 µm when the multilayer film of the present invention is used in a bag such as a medical solution bag. A multilayer film in which the properties of the lower layer (C) are fully exhibited can be obtained when the thickness of the lower layer (C) is within such a range.

The method for producing the multilayer film of this application can be used by a known method such as a water-cooling or air-cooling co-extrusion inflation method, a co-extrusion T die method, a dry lamination method, or an extrusion lamination method except that the above-described materials are used as the materials of the individual layers. Among these methods, a water-cooling co-extrusion inflation method and a co-extrusion T die method are preferable particularly from the viewpoints of transparency, economical efficiency of production, and hygienic of the multilayer film.

The production of the multilayer film needs to be conducted at a temperature at which the resins constituting the respective layers melt irrespective of the method employed. However, when the production temperature is excessively high, the resin may be partly pyrolyzed and degradation of performance may occur due to the decomposition products. Accordingly, the production temperature of the multilayer film is preferably 150 to 250° C. and more preferably 170 to 200° C. although the temperature is not limited to this.

<<Bag>>

A bag of the present invention is characterized in that it is formed of the multilayer film described above and the lower layer (C) is positioned at the surface with which the contents come into contact. The multilayer film is excellent in terms of properties such as transparency, flexibility, heat resistance, mechanical strength, low-temperature impact resistance, etc. Therefore, a bag formed of the multilayer film is excellent in terms of properties such as transparency, flexibility, heat resistance, mechanical strength, low-temperature impact resistance, etc. In particular, since the bag of the present invention has excellent heat resistance, the bag can be subjected to a sterilization treatment at high temperature (121° C.), wrinkles and degradation of transparency barely occur, and an adequate degree of flexibility and good transparency can be maintained even after the sterilization treatment at high temperature. Thus, the bag is suitable for use as a medical solution bag. Furthermore, since the bag of the present invention has excellent low-temperature impact resistance, the bag can sufficiently withstand use in a low-temperature environment and transportation in a low-temperature environment.

The bag can be produced by superimposing the lower layer of two multilayer films of the present invention and thermally press-bonding their peripheral portions.

A multilayer film may be formed into a bag by an inflation method such that the lower layer (C) is positioned at the surface with which the contents come into contact and thermally press-bonding the peripheral portion of the resulting bag-shaped multilayer film of the present invention.

The conditions for the thermal press-bonding are not particularly limited. For example, when a multilayer film having a total thickness of 180 to 280 μm is used, the temperature is preferably 130 to 200° C. and more preferably 150 to 180° C. and the pressure is preferably 0.1 to 0.8 Mpa and more preferably 0.15 to 0.5 Mpa. In this case, the pressuring time is preferably 1 to 5 seconds and more preferably 1.5 to 3 seconds.

A tubular member may be provided as a member through which a medical solution in the bag flows out of the bag or a medical solution flows into the bag.

The method for sterilizing the bag may be any common method. For example, a medical solution and other matters to be contained may be placed in a bag and sealed, and the bag may be subjected to a sterilization treatment.

The sterilization treatment method is not particularly limited. For example, a known heat sterilization method such as high-pressure vapor sterilization or hot shower sterilization can be employed.

The sterilization treatment temperature for these heat sterilization treatments is in general about 105 to 110° C. but may be set to 118 to 121° C. depending on the type, usage, and use environment of the medical solution.

Note that in the present invention, the melting point refers to a temperature at the apex of the melting peak of a DSC curve obtained by differential scanning calorimetry (DSC) (when two or more peaks are present, the temperature of the highest peak), i.e., a melting peak temperature $T_{pm}$ (° C.) (the same applies hereinafter).

More specifically, the melting point of the polymer in the present invention is a melting point measured by the following method.

First, about 1 g of pellets of the polymer are prepared. When a melting point of a mixture of a plurality of polymers is to be measured, a pellet sample obtained by heating a mixture of polymers mixed at an adequate ratio to a temperature of 200° C., kneading the mixture in a single-screw extruder, extruding the mixture into strands having a diameter of about 2 mm, cooling the strands with tap water, and cutting the strands into pellets.

Next, the pellet sample is sandwiched between Teflon (registered trademark) sheets 100 μm in thickness, and the pellet sample sandwiched between the sheets is left standing in a 200° C. atmosphere for 2 minutes and then pressed at 200° C. for 10 seconds. The melted sample is immediately placed between metal plates cooled with tap water so that the thickness of the sample is 0.1 to 0.5 mm and cooled for 1 minute. After the cooling, the sample is cut with a razor to get about 5 mg of a measurement sample, and the sample is weighted.

The cut out measurement sample is placed in an aluminum pan, heated from 30° C. to 200° C. at a heating rate of 500° C./min, and retained at 200° C. for 10 minutes. Then the temperature is decreased to 30° C. at a rate of 10° C./min and retained at 30° C. for 1 minute. Subsequently, the temperature is increased to 200° C. at a rate of 10° C./min to measure an endothermic curve and the DSC melting point is determined from the endothermic curve.

The density of the polymer in the present invention is specifically a density measured by the following method.

First, a polymer of the sample or a mixture of the polymers is placed in a melt indexer set to 190° C. and retained there for 6 minutes. When the MFR is 1 g/10 min or more, a load of 2.16 kg is applied and when the MFR is 0.1 to 1 g/10 min, a load of 5 kg is applied to form strands. The strands are directly dropped onto a metal plate to be quenched. The resulting strands are annealed for 30 minutes in boiling water and cooled to room temperature, 30° C., over 1 hour. Then the strands are pulled out and cut to a length of 2 to 3 mm. The cut strands are placed in a density-gradient tube and the density is determined by the static position of the sample after 1 hour.

The molecular weight distribution (Mw/Mn, Mw: weight-average molecular weight, Mn: number-average molecular weight, polystyrene equivalent) is specifically a molecular weight distribution measured under the following conditions.

A gel permeation chromatograph Alliance GPC-2000 series produced by Waters Corporation is used as a measuring apparatus and measurement is conducted as follows. The separation columns are two TSKgel GNH6-HT and two TSKgel GNH6-HTL. Each column size is 7.5 mm in diameter and 300 mm in length. The column temperature is 140° C. and o-dichlorobenzene is used as the mobile phase, 0.025% by weight of BHT is used as an antioxidant. The moving rate is 1.0 ml/min, the sample concentration is 15 mg/10 mL, and the amount of sample supplied is 500 μL. A differential refractometer is used as a detector. A value measured by using a standard polystyrene produced by Tosoh Corporation is employed as the molecular weight in the ranges of Mw<1000 and Mw>4×10$^6$, and a value measured by using a standard polystyrene produced by Pressure Chemical Co., is employed as a molecular weight in the range of 1000≤Mw≤4×10$^6$.

EXAMPLES

The present invention will now be described on the basis of Examples and Comparative Examples. However, the present invention is not limited to embodiments described below.

The trade names, properties, etc., of the materials for forming multilayer films of Examples and Comparative Examples are as follows.

Propylene polymer 1: J103WA produced by Prime Polymer Co., Ltd., melting point Tm: 165° C., melt flow rate: 4 g/10 min (230° C.), polymer (p1)

Propylene polymer 2: J105 produced by Prime Polymer Co., Ltd., melting point Tm: 165° C., melt flow rate: 14 g/10 min (230° C.), polymer (p1)

Propylene·α-olefin random copolymer 1: F327 produced by Prime Polymer Co., Ltd., melting point Tm: 137° C.

Propylene·α-olefin random copolymer 2: B242WC produced by Prime Polymer Co., Ltd., melting point Tm: 142° C., polymer (r2)

Propylene·α-olefin random copolymer 3: B205 produced by Prime Polymer Co., Ltd., melting point Tm: 158° C.

Following propylene·α-olefin random copolymers were obtained by a known method (e.g., refer to JP 2006-52313 A) of copolymerizing propylene and ethylene in the presence of a metallocene catalyst which is a combination of methylaluminoxane and diphenylmethylene(3-t-butyl-5-methylcyclopentadienyl(2,7-di-t-butylfluorenyl)zirconium chloride. Propylene·α-olefin random copolymers 4 to 7 were obtained by the same method except that the amount of ethylene used was changed.

Propylene·α-olefin random copolymer 4: melting point Tm: 115° C., molecular weight distribution: 2.7, MFR=9.4 g/10 min, polymer (r1)

Propylene·α-olefin random copolymer 5: melting point Tm: 115° C., molecular weight distribution: 2.7, MFR=2.9 g/10 min, polymer (r1)

Propylene·α-olefin random copolymer 6: melting point Tm: 134° C., MFR=10 g/10 min Propylene·α-olefin random copolymer 7: melting point Tm: 129° C., MFR=3.4 g/10 min Ethylene polymer 1: 4020B produced by Mitsui Chemicals Inc., density: 0.937 g/cm$^3$, melt flow rate: 2.0 g/10 min (230° C.)

Ethylene polymer 2: 1700J produced by Mitsui Chemicals Inc., density: 0.967 g/cm$^3$, melt flow rate: 15 g/10 min (230° C.)

Ethylene polymer 3: SP0510B produced by Mitsui Chemicals Inc., density: 0.905 g/cm$^3$, melt flow rate: 1.5 g/10 min (230° C.)

Ethylene polymer 4: 2010BM produced by Mitsui Chemicals Inc., density: 0.918 g/cm$^3$, melt flow rate: 2.0 g/10 min (230° C.)

Ethylene polymer 5: 65150B produced by Mitsui Chemicals Inc., density: 0.959 g/cm$^3$, melt flow rate: 17 g/10 min (190° C.)

Ethylene polymer 6: B128 produced by Ube-Maruzen Polyethylene, density: 0.928 g/cm$^3$, melt flow rate: 1.0 g/10 min (190° C.)

Propylene-based elastomer: PN3050 (produced by Mitsui Chemicals Inc.)

Ethylene-based elastomer: A0585X (produced by Mitsui Chemicals Inc.)

<Multilayer Film and Production of Bag>

Example 1

A multilayer film having a total thickness of 240 μm and comprising an upper layer, an intermediate layer, and a lower layer stacked in that order was produced by a water-cooling inflation method. The materials forming the respective layers are shown in Table 1 below. The numerical values in Table 1 represent the blend ratios (% by weight) of the constitutional materials of each layer.

Next, two multilayer films obtained as such were superimposed so that the lower layers face each other and the peripheral portions thereof were sealed to produce a bag having a maximum capacity of about 500 mL. The sealing was carried out at 160° C. for 2 seconds.

Examples 2 to 9, Comparative Examples 1 to 3, and Reference Examples 1 and 2

A multilayer film and a bag were produced as in Example 1 except that the materials that form each layer of the multilayer film and the contents thereof were changed as shown in Table 1.

TABLE 1

|  |  | Examples |  |  |  |  |  |  |  |  | Reference Examples |  | Comparative Examples |  |  |
|---|---|---|---|---|---|---|---|---|---|---|---|---|---|---|---|
|  | Constitutional materials | Ex. 1 | Ex. 2 | Ex. 3 | Ex. 4 | Ex. 5 | Ex. 6 | Ex. 7 | Ex. 8 | Ex. 9 | Ref. Ex. 1 | Ref. Ex. 2 | Co. Ex. 1 | Co. Ex. 2 | Co. Ex. 3 |
| Upper layer 20 μm | Propylene polymer 1 | 20 | 40 | 30 | 20 | 25 | 50 | 40 | 20 | 10 | 50 | 40 |  |  |  |
|  | Propylene α-olefin random copolymer 4 | 80 | 60 | 70 | 80 | 75 | 50 | 60 | 80 | 90 | 50 | 60 |  |  |  |
|  | Propylene α-olefin random copolymer 6 |  |  |  |  |  |  |  |  |  |  |  | 100 | 100 | 100 |
| Intermediate layer | Propylene polymer 1 | 12 | 12 | 12 | 6 | 10 | 18 | 18 | 6 | 6 | 24 | 24 |  |  |  |
|  | Propylene•α-olefin random copolymer 5 | 48 | 48 | 48 | 54 | 38 | 42 | 42 | 54 | 54 | 36 | 36 |  |  |  |
|  | Propylene•α-olefin random copolymer 7 |  |  |  |  |  |  |  |  |  |  |  | 70 | 60 | 55 |
|  | Propylene-based elastomer |  |  |  |  | 12 |  |  |  |  |  |  |  |  |  |
|  | Ethylene-based elastomer | 40 | 40 | 40 | 40 | 40 | 40 | 40 | 40 | 40 | 40 | 40 | 30 | 40 | 45 |

TABLE 1-continued

|  | Constitutional materials | Ex. 1 | Ex. 2 | Ex. 3 | Ex. 4 | Ex. 5 | Ex. 6 | Ex. 7 | Ex. 8 | Ex. 9 | Ref. Ex. 1 | Ref. Ex. 2 | Co. Ex. 1 | Co. Ex. 2 | Co. Ex. 3 |
|---|---|---|---|---|---|---|---|---|---|---|---|---|---|---|---|
| Lower layer 20 μm | Propylene polymer 1 | 14 | 14 | 14 | 14 | 14 | 21 | 21 | 7 | 7 | 28 | 28 |  |  |  |
|  | Propylene·α-olefin random copolymer 5 | 56 | 56 | 56 | 56 | 56 | 49 | 49 | 63 | 63 | 42 | 42 |  |  |  |
|  | Propylene·α-olefin random copolymer 7 |  |  |  |  |  |  |  |  |  |  |  | 80 | 70 | 70 |
|  | Ethylene-based elastomer | 30 | 30 | 30 | 30 | 30 | 30 | 30 | 30 | 30 | 30 | 30 | 20 | 30 | 30 |

Example 10

A multilayer film having a total thickness of 240 μm and comprising an upper layer, an intermediate layer (B), an intermediate layer (B-1), an intermediate layer (B), and a lower layer stacked in that order was produced by a water-cooling inflation method. The materials forming the respective layers are shown in Table 1 below. The numerical values in Table 1 represent the blend ratios (% by weight) of the constitutional materials of each layer.

Next, two multilayer films obtained as such were superimposed so that the lower layers face each other and the peripheral portions thereof were sealed to produce a bag having a maximum capacity of about 500 mL. The sealing was carried out at 160° C. for 2 seconds.

Examples 11 and 12, Comparative Example 4, and Reference Examples 3 to 8

A multilayer film and a bag were produced as in Example 10 except that the materials that form each layer of the multilayer film and the contents thereof were changed as shown in Table 2.

TABLE 2

| Layers | Constitutional materials | Ex. 10 | Ex. 11 | Ex. 12 | Ref. Ex. 3 | Ref. Ex. 4 | Ref. Ex. 5 | Ref. Ex. 6 | Ref. Ex. 7 | Ref. Ex. 8 | Co. Ex. 4 |
|---|---|---|---|---|---|---|---|---|---|---|---|
| Upper layer 20 μm | Propylene polymer 1 | 25 | 25 |  |  |  | 100 |  |  |  |  |
|  | Propylene polymer 2 |  |  | 100 |  |  |  | 100 |  |  |  |
|  | Propylene·α-olefin random copolymer 1 |  |  |  |  |  |  |  | 100 |  |  |
|  | Propylene·α-olefin random copolymer 4 | 75 | 75 |  |  |  |  |  |  |  |  |
|  | Propylene·α-olefin random copolymer 6 |  |  |  |  |  |  |  |  | 100 |  |
|  | Ethylene polymer 1 |  |  |  | 75 | 75 |  |  |  |  | 75 |
|  | Ethylene polymer 2 |  |  |  | 25 | 25 |  |  |  |  | 25 |
| Intermediate layer (B) | Propylene polymer 1 | 8 | 12 |  |  |  |  |  |  |  |  |
|  | Propylene·α-olefin random copolymer 2 |  |  | 40 | 40 | 60 | 40 | 40 | 60 |  |  |
|  | Propylene·α-olefin random copolymer 5 | 32 | 48 |  |  |  |  |  |  |  |  |
|  | Propylene·α-olefin random copolymer 7 |  |  |  |  |  |  |  |  | 60 |  |
|  | Ethylene based elastomer | 50 | 40 | 50 | 50 | 34 | 50 | 55 | 40 | 40 |  |
|  | Ethylene polymer 3 |  |  |  |  |  |  |  |  |  | 70 |
|  | Ethylene polymer 4 |  |  |  |  |  |  |  |  |  | 20 |
|  | Ethylene polymer 5 | 10 |  | 10 | 10 | 6 | 10 | 5 |  |  | 10 |
| Intermediate layer (B-1) 20 μm | Propylene polymer 1 | 16 | 16 |  |  |  |  |  |  |  |  |
|  | Propylene·α-olefin random copolymer 2 |  |  | 80 | 80 | 80 | 80 | 80 |  |  |  |
|  | Propylene·α-olefin random copolymer 3 |  |  |  |  |  |  |  | 80 |  |  |
|  | Propylene·α-olefin random copolymer 5 | 64 | 64 |  |  |  |  |  |  |  |  |
|  | Ethylene-based elastomer | 20 | 20 | 20 | 20 | 20 | 20 | 20 | 20 |  |  |
|  | Ethylene polymer 6 |  |  |  |  |  |  |  |  |  | 90 |
|  | Ethylene polymer 5 |  |  |  |  |  |  |  |  |  | 10 |
| Intermediate layer (B) | Propylene polymer 1 | 8 | 12 |  |  |  |  |  |  |  |  |
|  | Propylene·α-olefin random copolymer 2 |  |  | 40 | 40 | 60 | 40 | 40 | 60 |  |  |
|  | Propylene·α-olefin random copolymer 5 | 32 | 48 |  |  |  |  |  |  |  |  |

TABLE 2-continued

| Layers | Constitutional materials | Examples | | | Reference Examples | | | | | | Comparative Examples |
|---|---|---|---|---|---|---|---|---|---|---|---|
| | | Ex. 10 | Ex. 11 | Ex. 12 | Ref. Ex. 3 | Ref. Ex. 4 | Ref. Ex. 5 | Ref. Ex. 6 | Ref. Ex. 7 | Ref. Ex. 8 | Co. Ex. 4 |
| | Ethylene-based elastomer | 50 | 40 | 50 | 50 | 34 | 50 | 55 | 40 | | |
| | Ethylene polymer 3 | | | | | | | | | | 70 |
| | Ethylene polymer 4 | | | | | | | | | | 20 |
| | Ethylene polymer 5 | 10 | | 10 | 10 | 6 | 10 | 5 | | | 10 |
| Lower layer 20 μm | Ethylene-based elastomer | | | | | | | | | 20 | |
| | Ethylene polymer 1 | 40 | 40 | 55 | 75 | 75 | 55 | 75 | 75 | 55 | 75 |
| | Ethylene polymer 5 | 25 | 25 | 25 | 25 | 25 | 25 | 25 | 25 | 25 | 25 |
| | Ethylene polymer 3 | 35 | 35 | 20 | | | 20 | | | | |

<Evaluation of Properties>

Following properties of the multilayer films and bags obtained in Examples 1 to 12, Comparative Examples 1 to 4, and Reference Examples 1 to 8 were evaluated.

(1) Transparency

The bags obtained in Examples 1 to 12, Comparative Examples 1 to 4, and Reference Examples 1 to 8 were prepared and subjected to a high-pressure steam sterilization treatment at 121° C. for 20 minutes.

Next, the multilayer films forming the bags subjected to the high-pressure steam sterilization treatment were cut to obtain measurement samples, and the optical transmittance of each measurement sample in water at a wavelength of 450 nm was measured. Six measurement samples were prepared from each of three bags (total number of samples: 18). The measurement results are the averages of the measured values from 18 measurement samples.

(2) Plate Drop Strength

Two of each of the multilayer films obtained in each of Examples 1 to 12, Comparative Examples 1 to 4, and Reference Examples 1 to 8 were used to form a rectangular bag having a width of 130 mm and a length of 250 mm (a peripheral portion with a seal width of 5 mm is formed along four sides of the multilayer film) as a sample. About 500 mL of distilled water was charged into the rectangular bag.

Next, the rectangular bag was placed on a flat workbench in a 5° C. atmosphere, and an iron plate (30 cm in width and 32 cm in length) having a weight of 6.4 kg was dropped horizontally from above. The position from which the iron plate was dropped was varied to measure the fall (cm) of the iron plate that caused breaking of the rectangular bag, and the fall (cm) at breaking was assumed to be the plate drop strength. The measurement results are averages of values measured from a total of 10 samples.

(3) Low-temperature Impact Resistance

A medical solution bag (500 mL) was formed of each of the multilayer films obtained in Examples 1 to 12, Comparative Examples 1 to 4, and Reference Examples 1 to 8, immersed in 0° C. ice water for 5 hours or longer, and removed in a thoroughly cooled state. Then the bag was placed on an iron plate and a metal plate (about 37 cm×37 cm in size, 0.5 cm in thickness) having a weight of 6.8 kg was dropped in parallel from above so that the surface of the metal plate contacts the surface of the bag. The position from which the metal plate was dropped was varied to measure the height (dropping height) of the metal plate that caused breaking of the bag to measure the plate drop strength.

Results of the evaluation for the aforementioned evaluation items are shown in Tables 3 and 4.

TABLE 3

| Evaluation | Ex*. 1 | Ex. 2 | Ex. 3 | Ex. 4 | Ex. 5 | Ex. 6 | Ex. 7 | Ex. 8 | Ex. 9 | Ref. Ex.** 1 | Ref. Ex. 2 | Co. Ex.*** 1 | Co. Ex. 2 | Co. Ex. 3 |
|---|---|---|---|---|---|---|---|---|---|---|---|---|---|---|
| Light transmittance in water (%) | 91 | 92 | 93 | 94 | 91 | 90 | 89 | 91 | 93 | 86 | 88 | 91 | 91 | 92 |
| Haze (%) | 14 | 15 | 17 | 12 | | | | | | | | | | |
| Gloss (%) | 79 | 83 | 88 | | 88 | | 91 | 87 | | | 93 | | | |
| Wrinkles | | | | | | | | | | | | | | |
| Low-temperature plate drop strength (cm) | 50 | 43 | 49 | 43 | 50 | 42 | 40 | 30 | 40 | 23 | 28 | 15 | 25 | 30 |
| Young's modulus (Mpa) | 466 | 433 | 505 | 455 | 322 | 473 | 578 | 391 | 413 | 547 | 558 | | | |
| Barrier property (cc) | | | | | | | | | | | | | | |

Ex*. Example,

Ref. Ex**: Reference Example,

Co. Ex.***: Comparative Example

TABLE 4

| Evaluation | Ex. 10 | Ex. 11 | Ex. 12 | Ref. Ex. 3 | Ref. Ex. 4 | Ref. Ex. 5 | Ref. Ex. 6 | Ref. Ex. 7 | Ref. Ex. 8 | Co Ex. 4 |
|---|---|---|---|---|---|---|---|---|---|---|
| Light transmittance in water (%) | 86 | 87 | 83 | 79 | 81 | 79 | 85 | 83 | 84 | 76 |
| Haze (%) | 15 | 19 | | | | 29 | | | | |
| Gloss (%) | 96 | | 73 | | | 76 | | 54 | | |
| Wrinkles | | | | | | | Wrinkled | Wrinkled | | |
| Low-temperature plate drop strength (cm) | 50 | 68 | 88 | 90 | 20 | 82 | 73 | 35 | 32 | 62 |
| Young's modulus (Mpa) | | 449 | 527 | 405 | | 433 | 567 | | | |
| Barrier property (cc) | | 760 | | | | | | | | |

Ex*. Example,
Ref. Ex**: Reference Example,
Co. Ex.***: Comparative Example

The invention claimed is:

1. A multilayer film comprising an upper layer (A), an intermediate layer (B), an intermediate layer (B-1), an intermediate layer (B), and a lower layer (C) stacked in that order,
    wherein the intermediate layer (B) comprises a composition (b1) or a composition (b2) below,
    wherein the intermediate layer (B-1) comprises a composition (b-11) below or a composition (b-12) below, and the upper layer (A) and the lower layer (C) each independently comprise an ethylene polymer and/or a propylene polymer:
  Composition (b1): a composition that comprises
      a propylene polymer (p1) having a melting point in the range of 140 to 165° C. measured by differential scanning calorimetry and a melt flow rate (MFR; ASTM D 1238, 230° C., 2.16 kg load) in the range of 0.1 to 20 g/10 min,
      a propylene·α-olefin random copolymer (r1) having a molecular weight distribution in the range of 1.0 to 3.5 determined by gel permeation chromatography (GPC) and a melting point in the range of 90 to 125° C. measured by differential scanning calorimetry, and
      30% by weight to 60% by weight of an ethylene-based elastomer wherein the ethylene-based elastomer is an ethylene α-olefin random copolymer in which the α-olefin content is 3 to 39 mol% (where the sum of the contents of the propylene polymer (p1), the propylene·α-olefin random copolymer (r1), and the ethylene-based elastomer is 100% by weight)
      (when the intermediate layer (B) is composed of the composition (b1), the ratio of the content of the propylene polymer (p1) in the entire multilayer film to the sum of the contents of the propylene polymer (p1) and the propylene·α-olefin random copolymer (r1) in the entire multilayer film is 0.1 to 0.35);
  Composition (b2): a composition that comprises
      20 to 55% by weight of a propylene·α-olefin random copolymer (r2) having a melting point in the range of 125 to 145° C. measured by differential scanning calorimetry,
      35 to 60% by weight of an ethylene-based elastomer wherein the ethylene-based elastomer is an ethylene α-olefin random copolymer in which the α-olefin content is 3 to 39 mol%, and
      6 to 25% by weight of an ethylene polymer (e1) having a density in the range of 0.950 to 0.970 g/cm$^3$ and a melt flow rate (MFR; ASTM D 1238, 190° C., 2.16 kg load) in the range of 0.1 to 20 g/10 min (where the sum of the contents of the propylene·α-olefin random copolymer (r2), the ethylene-based elastomer, and the ethylene polymer (e1) is 100% by weight);
  Composition (b-11): a composition that comprises
      5 to 35% by weight of propylene polymer (p1) that has a melting point in the range of 140 to 165° C. measured by differential scanning calorimetry and a melt flow rate (MFR; ASTM D 1238, 230° C., 2.16 kg load) in the range of 0.1 to 20 g/10 min,
      50 to 90% by weight of a propylene·α-olefin random copolymer (r1) that has a molecular weight distribution in the range of 1.0 to 3.5 measured by gel permeation chromatography (GPC) and a melting point in the range of 90 to 125° C. measured by differential scanning calorimetry, and
      5 to 45% by weight of an ethylene-based elastomer wherein the ethylene-based elastomer is an ethylene a-olefin random copolymer in which the α-olefin content is 3 to 39 mol% (where the sum of the contents of the propylene polymer (p1), the propylene·α-olefin random copolymer (r1), and the ethylene-based elastomer is 100% by weight);
  Composition (b-12): a composition that comprises
      70 to 90% by weight of a propylene·α-olefin random copolymer (r2) having a melting point in the range of 125 to 145° C. measured by differential scanning calorimetry, and
      10 to 30% by weight of an ethylene-based elastomer wherein the ethylene-based elastomer is an ethylene α-olefin random copolymer in which the α-olefin content is 3 to 39 mol% (where the total of the contents of the propylene·α-olefin random copolymer (r2) and the ethylene-based elastomer is 100% by weight).

2. The multilayer film according to claim 1, wherein the composition (b1) is a composition (b1') below:
  Composition (b1'): a composition that comprises
      3 to 20% by weight of a propylene polymer (p1) that has a melting point in the range of 140 to 165° C. measured by differential scanning calorimetry and a melt flow rate (MFR; ASTM D 1238, 230° C., 2.16 kg load) in the range of 0.1 to 20 g/10 min,
      25 to 65% by weight of a propylene·α-olefin random copolymer (r1) that has a molecular weight distribution in the range of 1.0 to 3.5 measured by gel permeation chromatography (GPC) and a melting point in the range of 90 to 125° C. determined by differential scanning calorimetry,
      0 to 25% by weight of a propylene-based elastomer,
      30 to 60% by weight of an ethylene-based elastomer wherein the ethylene-based elastomer is an ethylene α-olefin random copolymer in which the α-olefin content is 3 to 39 mol%, and 0 to 15% by weight of an ethylene polymer (e1) having a density in the range of 0.950 to 0.970 g/cm³ and a melt flow rate (MFR; ASTM D 1238, 190° C., 2.16 kg load) in the range of 0.1 to 20 g/10 min (where the sum of the contents of the propylene polymer (p1), the propylene·α-olefin random copolymer (r1), the propylene-based elastomer, the ethylene-based elastomer, and the ethylene polymer (e1) is 100% by weight).

3. The multilayer film according to claim 1, wherein the upper layer (A) comprises a composition (a1) below or a propylene polymer (p1) below:

Composition (a1): a composition that comprises 5 to 55% by weight of a propylene polymer (p1) that has a melting point in the range of 140 to 165° C. measured by differential scanning calorimetry and a melt flow rate (MFR; ASTM D 1238, 230° C., 2.16 kg load) in the range of 0.1 to 20 g/10 min, and 45 to 95% by weight of a propylene·α-olefin random copolymer (r1) having a molecular weight distribution in the range of 1.0 to 3.5 determined by gel permeation chromatography (GPC) and a melting point in the range of 90 to 125° C. measured by differential scanning calorimetry (where the sum of the contents of the propylene polymer (p1) and the propylene·α-olefin random copolymer (r1) is 100% by weight);

Propylene polymer (p1): a propylene polymer that has a melting point in the range of 140 to 165° C. measured by differential scanning calorimetry and a melt flow rate (MFR; ASTM D 1238, 230° C., 2.16 kg load) in the range of 0.1 to 20 g/10 min.

4. The multilayer film according to claim 1, wherein the lower layer (C) comprises a composition (c1) below or a composition (c2) below:

Composition (c1): a composition that comprises 5 to 30% by weight of a propylene polymer (p1) that has a melting point in the range of 140 to 165° C. measured by differential scanning calorimetry and a melt flow rate (MFR; ASTM D 1238, 230° C., 2.16 kg load) in the range of 0.1 to 20 g/10 min, 45 to 70% by weight of a propylene·α-olefin random copolymer (r1) that has a molecular weight distribution in the range of 1.0 to 3.5 measured by gel permeation chromatography (GPC) and a melting point in the range of 90 to 125° C. measured by differential scanning calorimetry, and 20 to 50% by weight of an ethylene-based elastomer wherein the ethylene-based elastomer is an ethylene α-olefin random copolymer in which the α-olefin content is 3 to 39 mol% (where the sum of the contents of the propylene polymer (p1), the propylene·α-olefin random copolymer (r1), and the ethylene-based elastomer is 100% by weight);

Composition (c2): a composition that comprises 25 to 60% by weight of a linear polyethylene having a density in the range of 0.916 to 0.940 g/cm³, 10 to 30% by weight of a high-density polyethylene having a density in the range of 0.950 to 0.970 g/cm³, and 20 to 45% by weight of a single-site-catalyzed linear polyethylene having a density in the range of 0.900 to 0.910 g/cm³ (where the sum of the contents of the linear polyethylene, the high-density polyethylene, and the single-site-catalyzed linear polyethylene is 100% by weight).

5. The multilayer film according to claim 1, comprising the upper layer (A), the intermediate layer (B), the intermediate layer (B-1), the intermediate layer (B), and the lower layer (C) stacked in that order, wherein the upper layer (A) comprises a composition (a1) below:

Composition (a1): a composition that comprises 15 to 35% by weight of a propylene polymer (p1) that has a melting point in the range of 140 to 165° C. measured by differential scanning calorimetry and a melt flow rate (MFR; ASTM D 1238, 230° C., 2.16 kg load) in the range of 0.1 to 20 g/10 min, and 65 to 85% by weight of a propylene·α-olefin random copolymer (r1) having a molecular weight distribution in the range of 1.0 to 3.5 determined by gel permeation chromatography (GPC) and a melting point in the range of 90 to 125° C. measured by differential scanning calorimetry (where the sum of the contents of the propylene polymer (p1) and the propylene·α-olefin random copolymer (r1) is 100% by weight), the intermediate layer (B) comprises a composition (b1') below:

Composition (b1'): a composition that comprises 3 to 20% by weight of a propylene polymer (p1) that has a melting point in the range of 140 to 165° C. measured by differential scanning calorimetry and a melt flow rate (MFR; ASTM D 1238, 230° C., 2.16 kg load) in the range of 0.1 to 20 g/10 min, 25 to 65% by weight of a propylene·α-olefin random copolymer (r1) that has a molecular weight distribution in the range of 1.0 to 3.5 measured by gel permeation chromatography (GPC) and a melting point in the range of 90 to 125° C. determined by differential scanning calorimetry, 0 to 25% by weight of a propylene-based elastomer, 30 to 60% by weight of an ethylene-based elastomer wherein the ethylene-based elastomer is an ethylene α-olefin random copolymer in which the α-olefin content is 3 to 39 mol%, and 0 to 15% by weight of an ethylene polymer (e1) having a density in the range of 0.950 to 0.970 g/cm³ and a melt flow rate (MFR; ASTM D 1238, 190° C., 2.16 kg load) in the range of 0.1 to 20 g/10 min (where the sum of the contents of the propylene polymer (p1), the propylene·α-olefin random copolymer (r1), the propylene-based elastomer, the ethylene-based elastomer, and the ethylene polymer (e1) is 100% by weight), the intermediate layer (B-1) comprises the composition (b-11), and the lower layer (C) comprises a composition (c2) below:

Composition (c2): a composition that comprises 25 to 60% by weight of a linear polyethylene having a density in the range of 0.916 to 0.940 g/cm³, 10 to 30% by weight of a high-density polyethylene having a density in the range of 0.950 to 0.970 g/cm³, and 20 to 45% by weight of a single-site-catalyzed linear polyethylene having a density in the range of 0.900 to 0.910 g/cm³ (where the sum of the contents of the linear polyethylene, the high-density polyethylene, and the single-site-catalyzed linear polyethylene is 100% by weight).

6. The multilayer film according to claim 1, comprising the upper layer (A), the intermediate layer (B), the intermediate layer (B-1), the intermediate layer (B), and the lower layer (C) stacked in that order, wherein the upper layer (A) comprises the propylene polymer (p1), each of the intermediate layers (B) comprises the composition (b2), the intermediate layer (B-1) comprises the composition (b-12), and the lower layer (C) comprises a composition (c2) below:

Composition (c2): a composition that comprises 25 to 60% by weight of a linear polyethylene having a density in the range of 0.916 to 0.940 g/cm$^3$, 10 to 30% by weight of a high-density polyethylene having a density in the range of 0.950 to 0.970 g/cm$^3$, and 20 to 45% by weight of a single-site-catalyzed linear polyethylene having a density in the range of 0.900 to 0.910 g/cm$^3$ (where the sum of the contents of the linear polyethylene, the high-density polyethylene, and the single-site-catalyzed linear polyethylene is 100% by weight).

7. A bag formed of the multilayer film according to claim 1, wherein an inner surface of the bag is the lower layer (C).

\* \* \* \* \*